United States Patent
Woodward et al.

[11] Patent Number: 6,098,924
[45] Date of Patent: Aug. 8, 2000

[54] METHOD AND APPARATUS FOR GENERATING PROPULSIVE FORCES WITHOUT THE EJECTION OF PROPELLANT

[75] Inventors: James Woodward, Anaheim; Thomas Mahood, Irvine, both of Calif.

[73] Assignee: California State University, Fullerton Foundation

[21] Appl. No.: 09/236,188

[22] Filed: Jan. 23, 1999

[51] Int. Cl.[7] ................................................. B64D 35/00
[52] U.S. Cl. ............................................. 244/62; 244/172
[58] Field of Search ................... 244/62, 53 R, 244/172

[56] References Cited

U.S. PATENT DOCUMENTS 5,280,864   1/1994   Woodward .................................. 244/62

Primary Examiner—Galen L. Barefoot
Attorney, Agent, or Firm—Leonard Tachner

[57] ABSTRACT

Mach's principle and local Lorentz-invariance together yield the prediction of transient rest mass fluctuations in accelerated objects. These restmass fluctuations, in both principle and practice, can be quite large and, in principle at least, negative. They suggest that exotic space time transport devices may be feasible, the least exotic being "impulse engines", devices that can produce accelerations without ejecting any material exhaust. Such "impulse engines" rely on inducing transient mass fluctuations in conventional electrical circuit components and combining them with a mechanically coupled pulsed thrust to produce propulsive forces without the ejection of any propellant. The invention comprises a method of producing propellant-less thrust by using force transducers (piezoelectric devices or their magnetic equivalents) attached to resonant mechanical structures. The force transducers are driven by two phase-locked voltage waveforms so that the transient mass fluctuation and mechanical excursion needed to produce a stationary thrust are both produced in the transducer itself.

20 Claims, 19 Drawing Sheets

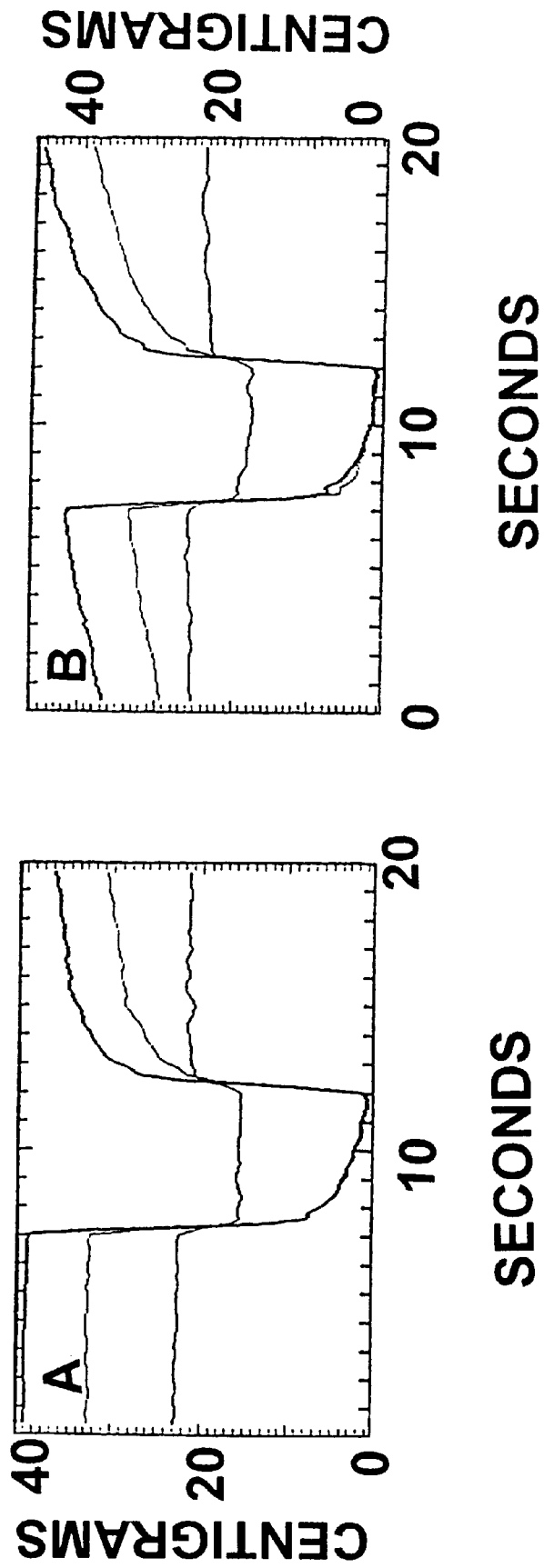

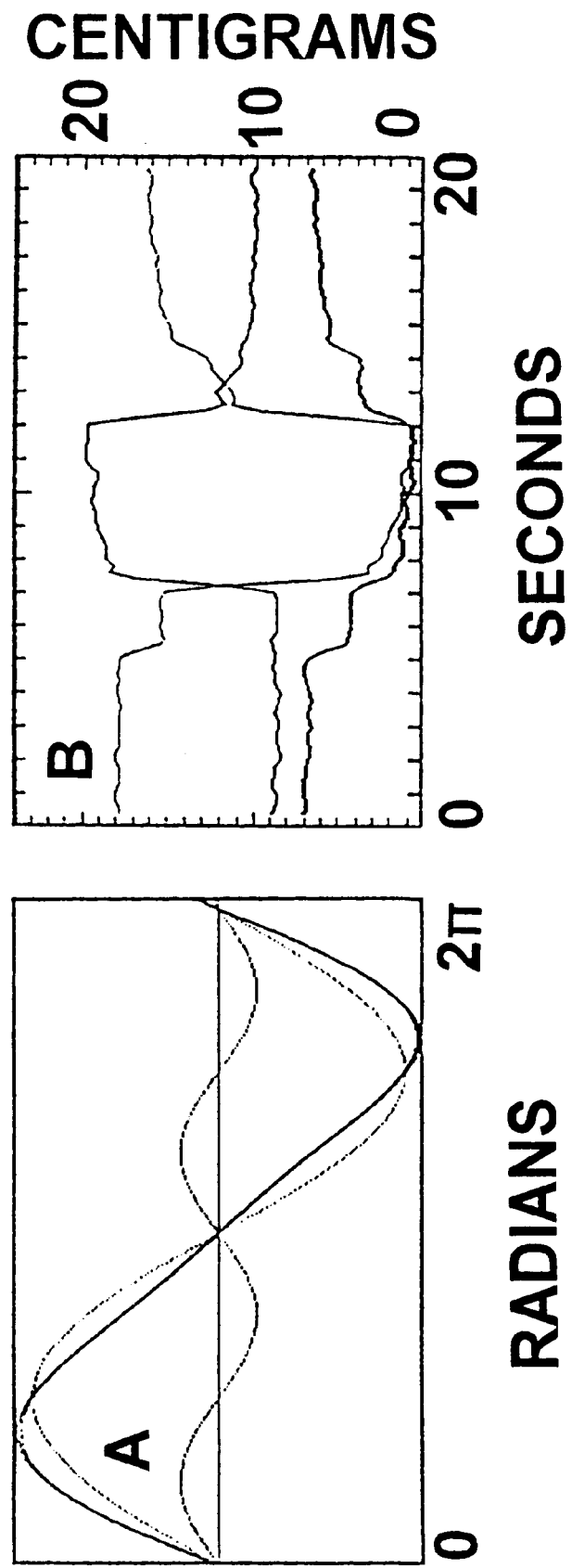

METHOD AND APPARATUS FOR GENERATING PROPULSIVE FORCES WITHOUT THE EJECTION OF PROPELLANT

BACKGROUND OF THE INVENTION

1. Field of the Invention

The present invention relates generally to propulsion and specifically to a method of producing propellant-less thrust using mass fluctuation.

2. Prior Art

Aerospace propulsion technology to date has rested firmly on simple applications of the reaction principle: Creating motion by expelling propellant mass from a vehicle. A peculiar, overlooked relativistic effect makes it possible to induce large, transient rest mass fluctuations in electrical circuit components [Woodward, J. F. (1990), "A New Experimental Approach to Mach's Principle and Relativistic Graviation [sic]" Found. Phys. Lett. 3, 497–506; (1992), "A Stationary Apparent Weight Shift from a Transient Machian Mass Fluctuation" Found. Phys. Left. 5, 425–442]. An innovative implementation of this effect is to make engines that accelerate without the expulsion of any material whatsoever. This can be done because when the effect is combined with a pulsed thrust in appropriate circumstances, stationary forces can be produced [Woodward, J. F. (1992) "A Stationary Apparent Weight Shift from a Transient Machian Mass Fluctuation" Found. Phys. Lett. 5, 425–442; (1994), "Method for Transiently Altering the Mass of Objects to Facilitate their Transport of Change their Stationary Apparent Weights" U.S. Pat. No. 5,280,864, U.S. GPO, January 25; (1997b) "Mach's Principle and Impulse Engines: Toward a Viable Physics of Star Trek?" invited paper for the 1997 NASA "Breakthrough Propulsion Physics" workshop at the Lewis Research Center, August 12–14]. "Impulse engines" are achieved without any moving parts (in the conventional sense). The concepts involved are supported by experimental results already in hand. It is therefore desirable to create methods of configuring components that optimize these devices and increase their practical utility.

The transient mass fluctuation effect upon which the method of this invention (and the invention of U.S. Pat. No. 5,280,864) depends is predicated upon two essentially universally accepted assumptions. First, from general relativity theory: Inertial reaction forces in objects subjected to accelerations are produced by the interaction of the accelerated objects with a field, (produced chiefly by the most distant matter in the universe)—they are not the immediate consequence of some inherent property of the object alone. And second: Any acceptable physical theory must be locally Lorentz-invariant; that is, in sufficiently small regions of space-time special relativity theory (SRT) must obtain. Using standard techniques of physical and mathematical analysis, these assumptions lead, for a particle of matter with rest mass density $\rho_0$ in a universe like ours (with essentially constant matter density when considered at the large scale) when accelerated by an external force, to the equation for the gravitation field potential $\phi$ in terms of its local sources:

$$\nabla^2 \phi - (1/c^2)(\partial^2 \phi / \partial t^2) = 4\pi G \rho_0 + (\phi/\rho_0 c^2)(\partial^2 \rho_0 / \partial t^2) -$$
$$(\phi/\rho_0 c^2)^2 (\partial \rho_0 / \partial t)^2 -$$
$$c^{-4}(\partial \phi / \partial t)^2.$$

In this equation G is the Newtonian constant of universal gravitation, c is the vacuum speed of light, and $P_0$ is the local rest-mass density. Details of the derivation of this field equation can be found in Woodward, 1990, 1992, 1995, 1997a and 1997b [Woodward, J. F. (1990), "A New Experimental Approach to Mach's Principle and Relativistic Graviation [sic]" Found. Phys. Lett. 3 497–506; (1992), "A Stationary Apparent Weight Shift from a Transient Machian Mass Fluctuation" Found. Phys. Lett. 5, 425–442; (1995), "Making the Universe Safe for Historians: Time Travel and the Laws of Physics" Found. Phys. Lett. 8, 1–39; (1997a), "Twists of Fate: Can We Make Traversable Wormholes in Spacetime?" Found. Phys. Lett. 10, 153–181; (1997b), "Mach's Principle and Impulse Engines: Toward a Viable Physics of Star Trek?" invited paper for the 1997 NASA "Breakthrough Propulsion Physics" workshop at the Lewis Research Center, August 12–14. The equation is at least approximately valid for all relativistic theories of gravity.

In stationary circumstances, where all terms involving time derivatives vanish, the field equation above reduces to Poisson's equation, and the solution for $\phi$ is just the sum of the contributions to the potential due to all of the matter in the causally connected part of the universe, that is, within the particle horizon. This turns out to be roughly GM/R, where M is the mass of the universe and R is about c times the age of the universe. Using reasonable values for M and R, GM/R is about $c^2$. In the time-dependent case we must take account of the terms involving time derivatives on the right hand side of this equation. Note that these terms either are, or in some circumstances can become, negative. It is the fact that these terms can also be made very large in practicable devices with extant technology that makes them of interest for rapid space time transport, the chief area of application of impulse engines.

Since the predicted mass shift is transient, large effects can only be produced in very rapidly changing proper matter (or energy) densities produced by accelerating matter. From the point of view of detection of the effect, this means that the duration of any substantial effect will be so short that it cannot be measured by usual weighing techniques. If however, we drive a periodic mass fluctuation and couple it to a synchronous pulsed thrust, it is possible to produce a measurable stationary effect [Woodward, J. F. (1992), "A Stationary Apparent Weight Shift from a Transient Machian Mass Fluctuation" Found. Phys. Lett. 5, 425–442; (1994), "Method for Transiently Altering the Mass of Objects to Facilitate their Transport of Change their Stationary Apparent Weights" U.S. Pat. No. 5,280,864, U.S. GPO, January 25 ; (1996b), "A Laboratory Test of Mach's Principle and Strong-Field Relativistic Gravity" Found. Phys. Lett. 9, 425–442]. Consider, for example, the generic apparatus shown in FIG. 1 in which a stationary net force is produced by generating a periodic mass fluctuation in a capacitor array (CA) and synchronously causing the length of a piezoelectric force transducer (PZT) to oscillate so that the inertial reaction force of the accelerating CA on the PZT and enclosure (E) is added to the weight of the assembly which is detected by the depression of the steel diaphragm (D) measured by the position sensor (S), all of which is located in a thick walled aluminum case Ⓒ mounted on a seismically isolated table. Here a mass fluctuation is produced in the CA by driving them with an AC voltage. While the mass of the CA fluctuates, the PZT causes a synchronous, oscillatory acceleration of the CA. The inertial reaction force F felt by the PZT [and the enclosure (E) in which it is mounted] will be the product of the instantaneous mass of the CA times the acceleration of the CA induced by the PZT. If the mass fluctuation and acceleration are both sinusoidal and phase-locked at the same frequency, then their product yields a phase-dependent, time-independent term—a stationary force.

The magnitude of this stationary force is calculated in detail in Woodward, 1992, 1994, 1996b and 1997b. If we drive an oscillation in a PZT arranged like that in FIG. 1 with amplitude $\delta l_0$ at a frequency of $2\omega$, assume that the mass of the CA is small compared to that of the enclosure E so that the excursion of the PZT accelerates the CA only and allow for a phase angle $\delta$ between $\delta m_0$ and $\delta l_0$, the time averaged inertial reaction force $<F>=<\delta m(t)a(t)>$ detected by the sensor S (as a change in equilibrium position due to the change in the force on the diaphragm spring D) is:

$<F>=-2\omega^2 \delta l_0 \delta m_0 \cos\ominus.$ $\delta m_0$ is the amplitude of the mass fluctuation induced when a sinusoidal voltage of angular frequency $\omega$ is applied to the capacitors. That is, the application of the voltage to the capacitors leads to an instantaneous power $P=P_0 \sin(2\omega t)$ in the circuit, leading to a mass fluctuation:

$\delta m(t)=(\phi\omega P_0/2nG\rho_0 c^4)\cos(2\omega t)=\delta m_0 \cos(2wt).$ The reality of the effect involved here and its implementation in producing stationary forces has been demonstrated in laboratory experiments [Woodward, 1996b, 1997b and below]. In this work $\delta l_0$ was a few angstroms (easily achieved with normal PZTs). When $P_0 \cong 250$ watts, $\omega \cong 8.8\times 10^4$ (14 kHz), and $\cos \ominus \cong \pm 1$, forces on the order of tens of dynes or more were produced in the apparatus. In practice one takes the difference between runs adjusted so that $\cos \ominus \cong -1$. Results obtained at 14 kHz with a device of this sort are shown in FIG. 2. FIG. 2 displays the averaged results obtained with a device like that is shown in FIG. 1 where a capacitor array with a total capacitance of 0.02 microfarads mounted between piezoelectric transducers that produce an excursion of several hundred Angstroms was run at a power frequency of 28 kiloHertz during the time interval 7 to 12 seconds out of the 20 second data acquisition interval, resulting in a net force of about ninety five milligrams (dynes) when the data acquired for relative phases 180 degrees apart were differenced. The traces for the averages of the two phase settings are those that show large changes in the active interval. The heavy trace is that for 0 degrees of phase and the light trace that for 180 degrees of phase. The difference of these traces is the heavy trace that roughly vertically bisects the plot. These results were obtained with the case evacuated to a pressure of less than 15 mm of Hg. At 5 seconds into a data acquisition cycle the CA is powered up. In the 7 to 12 second interval both the CA and PZT are active. And at 14 seconds the CA is switched off. Typically one to two dozen such cycles are taken in a run with the phase $\ominus$ switched back and forth by 180 degrees in alternating cycles of data. When the averages for the two phases are differenced, they produce the displayed differential weight shift. It is forces of the sort just described that can be used to make impulse engines.

SUMMARY OF THE INVENTION

The simplest impulse engine consists of electrical devices in which transient mass fluctuations can be induced by suitable electrical currents (capacitors with material dielectrics or inductors with material cores) affixed to force transducer(s) that produce the synchronous pulsed thrust needed to generate stationary forces on the object to which they are attached (likely a vehicle of some sort). A more efficient design employs two devices in which mass fluctuations are driven mounted on the ends of a force transducer, as in FIG. 3. FIG. 3 is a schematic illustration of the principle of the method of two element impulse engines, the elements in which the periodic mass fluctuations are driven being inductive L and capacitative C elements of a resonant circuit mounted on the ends of a force transducer that expands and contracts at the frequency of the mass fluctuations yielding a net force, and thus net motion, in the indicated direction when the phase of the mass fluctuation relative to the force transducer oscillation is that shown. When the mass fluctuations in the two devices are 180 degrees out of phase, the stationary forces produced by each device are in the same direction, doubling the output of the engine. This arrangement has the added advantage that the two devices can be made the capacitative and inductive components of a resonant circuit driven by a single power supply. A resonant circuit allows one to minimize the amount of external power required to drive the electrical oscillation in the circuit (after the circuit has been initially activated) that produces the mass fluctuations. Since the phase of the power flow in the capacitative and inductive elements differs by 180 degrees, the relative phase of the mass fluctuations automatically satisfy the requirement of an impulse engine. The relative phase of the mass fluctuations and the force transducer oscillations is then adjusted to maximize the stationary force produced by the engine.

The straight-forward elaborations of U.S. Pat. No. 5,280,864 just discussed are all predicated on the supposition that transient mass fluctuations are driven with appropriate periodically varying (AC) electrical signals in discrete inductive or capacitative circuit elements. Those circuit elements are then set into motion by a separate, discrete force transducer, for example, a piezoelectric device or the equivalent driven with a separate AC electrical signal [suitably phase-locked to the power waveform of the signal driving the transient mass fluctuations in the other discrete component(s)]. The crux of the invention here disclosed is to simplify systems of this sort by using the force transducer(s) as the source of the motion needed to produce the inertial reaction force(s) that cause the net thrust, and at the same time drive the required mass fluctuation(s) in the same force transducer(s).

BRIEF DESCRIPTION OF THE DRAWINGS

The invention is described herein by reference to the scientific basis in observation, theory, and experiment on which rests the full range of useful application of the invention and by reference to the annexed drawings in which:

FIG. 7b displays the sensor oscillation amplitudes, obtained by rectifying and filtering the AC coupled part of the total (AC and quasi-DC) sensor signal, corresponding to the results shown in FIG. 7a;

FIGS. 9c–9d displays the oscillation amplitude traces and their difference that correspond to the traces presented in FIG. 9a;

FIG. 10a displays the quasi-stationary force sensor traces and their difference obtained with Device 2 operating with atmospheric pressure in the case;

FIG. 10b displays the quasi-stationary force sensor traces and their difference obtained with Device 2 operating with the case evacuated;

FIG. 10c displays the oscillation amplitude traces and their difference that correspond to the traces presented in FIG. 10a;

FIG. 11c displays the oscillation amplitude traces and their difference that correspond to the traces presented in FIG. 11a;

FIG. 11d displays the oscillation amplitude traces and their difference that correspond to the traces presented in FIG. 11b;

FIGS. 14a–14d present the component and summed waveforms (FIGS. 14a and 14c), used to excite the device shown in FIG. 13 yielding results (shown in FIGS. 14b and 14d) respectively at the 50 Watt power level.

DETAILED DESCRIPTION OF THE INVENTION

Figure 1:
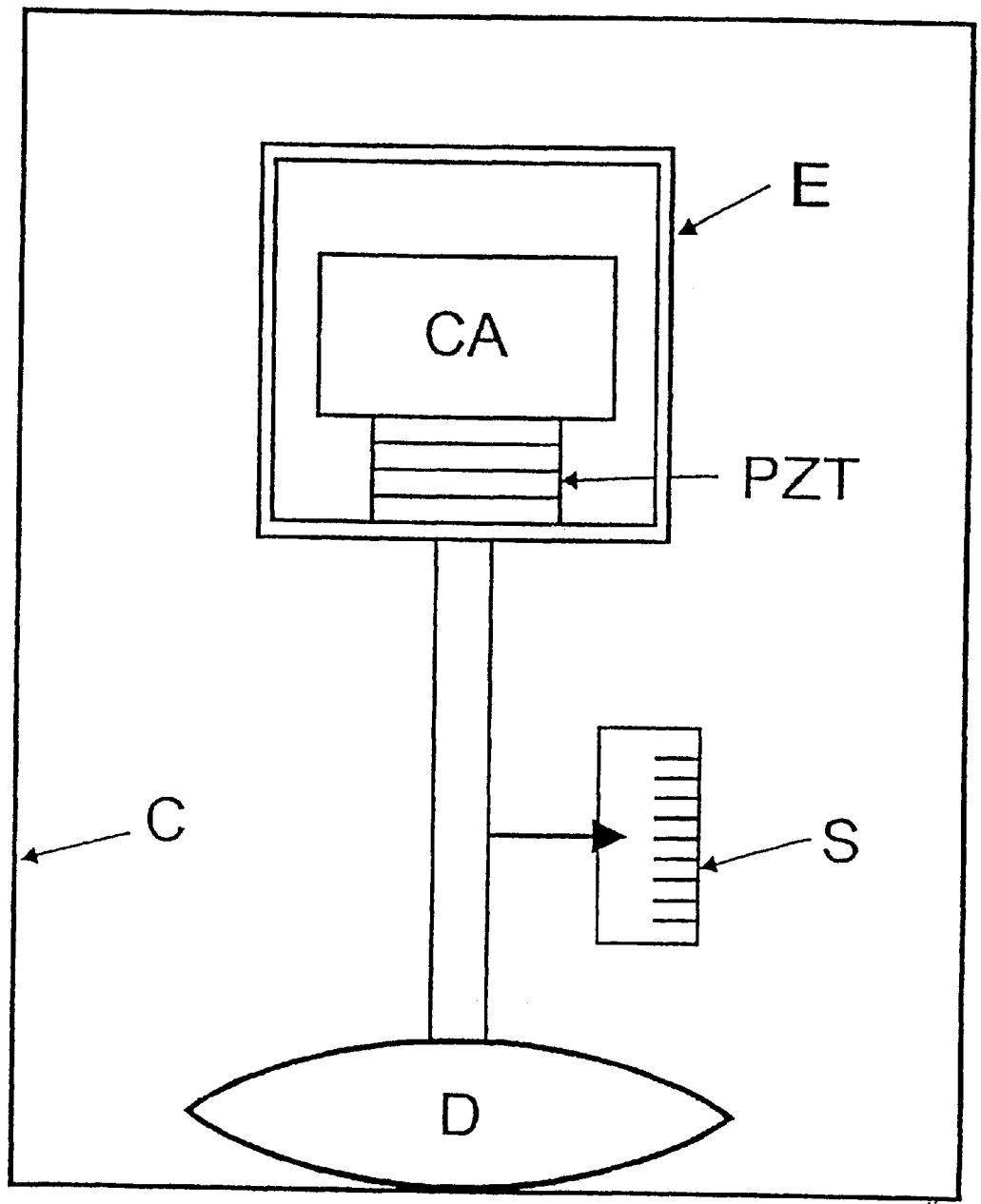
FIG. 1 is a schematic drawing of an apparatus in which a stationary net force is produced by generating a periodic mass fluctuation in a capacitor array CA and synchronously causing the length of a piezoelectric force transducer PZT to oscillate.

Force transducers come in a variety of forms. We shall be interested in those where time varying electromagnetic fields are applied to material cores. Capacitive transducers of this sort are exemplified by (but not limited to) piezoelectric devices; and inductive transducers are exemplified by (but not limited to) solenoidal devices. In both cases, when a time varying electromagnetic field is applied to these devices, energy is stored in the dielectric or magnetizable cores by the polarization of the material. Such polarization induces the acceleration of the constituents of the core material and accordingly a transient mass fluctuation ensues in the core. When a periodic, say sinusoidal, electromagnetic field is applied to one of these devices at some well defined frequency $\omega$, a transient mass fluctuation with frequency $2\omega$ is driven in the core material. Since the frequency of the mass fluctuation is twice the frequency of the signal driving the excursion of the transducer, no stationary thrust is generated in the transducer by the interaction of the mass fluctuation with the excursion at the fundamental frequency. (That is the reason why the devices we have explored to this point have been designed with components where the mass fluctuations and mechanical excursions were generated in discrete components).

If, however, the driving signal excited a second harmonic excursion in a force transducer (through, for example, electrostriction in the case of a piezoelectric device), then the interaction of this excursion with the induced mass fluctuation will produce a net thrust if the phase relationship of the mass fluctuation and second harmonic excursion is such that cos ⊖ for <F>in the above expression is not equal to zero. Since the mass fluctuation is phase-locked with respect to the driving signal, the relative phase of the second harmonic excursion and mass fluctuation cannot be simply adjusted. So, while the amplitude of such an effect can be adjusted by changing the amplitude of the driving signal, it cannot be explored by adjustment of the relative phase of the excursion and mass fluctuation. And such an effect, if present in a given transducer, might be far smaller than possible because cos ⊖ might be inadjustably close to zero. Similarly, because a single frequency driving signal is used, the relative amplitudes of the second harmonic excursion and mass fluctuation cannot be adjusted.

The key aspect of the method of this invention is that a mass fluctuation may be driven in a force transducer by applying an electromagnetic signal of one particular frequency and at the same time an excursion that takes place at the frequency of the mass fluctuation needed to produce a stationary thrust can be induced by applying another electromagnetic signal at twice the frequency of the first to the transducer with suitable (and adjustable) relative phase and amplitude. This may be achieved, for example, by applying an AC electrical voltage signal to the force transducer(s) that consists of the sum of two (or more) simple sinusoidal waveforms, (at least) one being twice the frequency of the other and suitably phase-locked to the power (voltage times current) waveform that results from the lower frequency signal. (In optimized devices waveforms with more than two simple sinusoidal wave components may prove desirable). The transducer(s) to which such complex waveforms are delivered is (are) then affixed to the device upon which the generated thrust is to be exerted in such a way that the transducer and mounting apparatus are strongly mechanically resonant at the higher of the two frequencies, but not resonant at the lower of the two frequencies.

Figure 4:
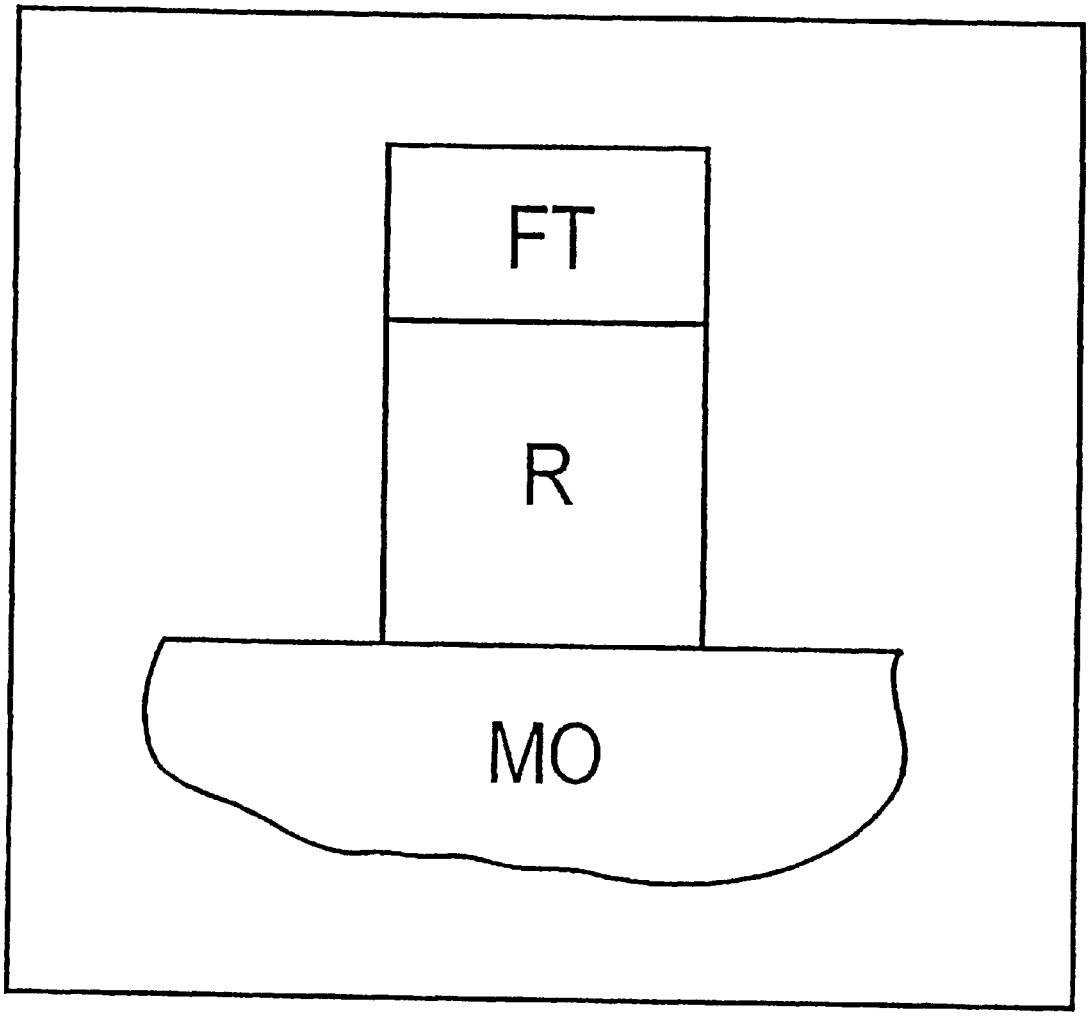
FIG. 4 is a schematic diagram of a single active component impulse engine.

As a purely illustrative, non-limiting example of this method, consider the simplest possible system of this sort shown in FIG. 4. A force transducer (FT, for example, one (or more) piezoelectric crystal disk(s)) is affixed to a short, rigid, elastic rod (R), which is in turn affixed to some massive object (MO, for example, some device such as a vehicle) upon which the thrust generated in the FT and R is to act. The physical properties and dimensions of the FT and R are chosen so that the lowest frequency mechanical resonance in the FT and R along the vertical axis in FIG. 4 that passes through the FT and R occurs at the higher of the two voltage frequencies used to excite the FT. (To optimize this device, the dimensions of the FT and R should also be chosen so that only the mechanical extension mode in them is excited at this frequency. That way energy is not sinked into oscillatory modes that do not contribute to the generated thrust). So disposed, only a very modest voltage signal at the mechanical resonance frequency need be applied to produce large excursions of the FT.

In order to generate the thrust in the system FT/R/MO, all that needs to be done is to apply a very large voltage signal, tuned to half the mechanical resonance frequency, to the FT. Since the mechanical resonance frequency is designed to be the lowest frequency mode of oscillation, this large voltage signal will not drive a strong mechanical oscillation in the device, notwithstanding that a strong piezoelectric response can be expected in the FT. But the fluctuating power will induce a large oscillatory transient mass fluctuation in the FT at twice the frequency of the applied voltage signal. The resulting mass fluctuation, being at the mechanical resonance frequency of the FT and R, if large enough, may be expected to excite a mechanical oscillation at that frequency. The resulting mechanical oscillation will be phase-locked to the power waveform of the low frequency component of the voltage signal. Depending on the details of the dimensions of the device that determine the phase relationship between the mass fluctuation and the mechanical excursion it excites, the application of the low frequency voltage signal to the FT and R may, or may not, result in the production of a stationary thrust on the MO.

Figure 5:
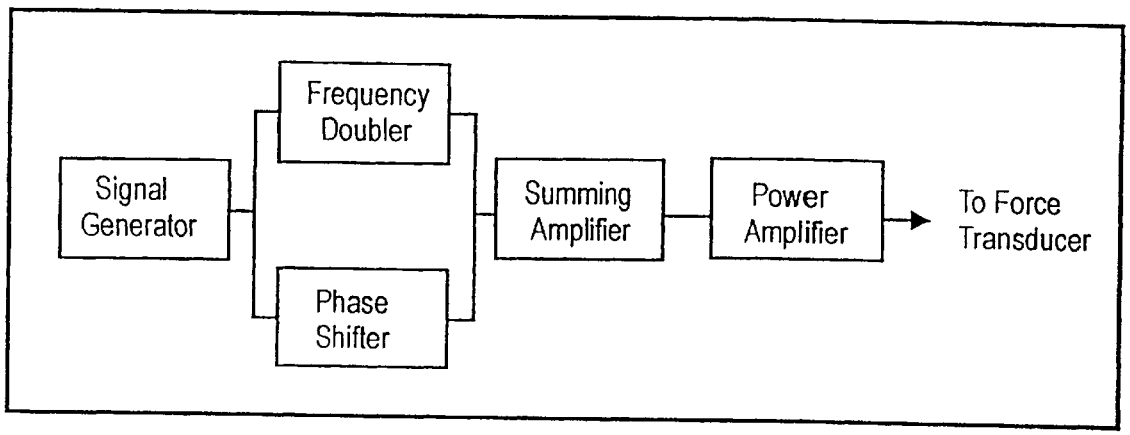
FIG. 5 is a schematic diagram of electrical circuitry required to generate the phase-locked, phase adjustable electrical signals that produce the desired thrust.

To insure that a steady thrust is generated in the FT and R and to facilitate its control, a voltage signal at the mechanical resonance frequency is applied to the FT simultaneously with the low frequency voltage signal that induces the transient mass fluctuation in the FT. While the high frequency voltage signal must be phase-locked to the power waveform of the low frequency voltage signal, their relative phase can be easily adjusted by conventional electronic circuitry (i.e., "phase shifters"). Accordingly, the phase of the mechanical oscillation (controlled by the high frequency voltage signal) and the transient mass fluctuation (controlled by the low frequency voltage signal) can be manipulated to maximize, minimize or reverse the thrust applied to the MO by a simple phase adjustment of the two voltage signals before they are summed. (The amount of thrust generated can also be controlled by adjusting the amplitude(s) of the voltage signal(s) delivered to the FT). A block diagram of generic electronic circuitry that, in conjunction with a generic device like that of FIG. 4, will achieve this performance is shown in FIG. 5. FIG. 5 is a schematic diagram of the chief electrical circuitry required to generate the phase-locked, phase adjustable electrical signals that, combined in a summing amplifier and then further amplified in a power amplifier, are applied to the FT of FIG. 4 produce the desired thrust. Since the devices driven operate at or near mechanical resonance, the signal generator must be stable to about a part in one hundred thousand. The output of the frequency doubler must likewise be stable and free from any low frequency modulation.

With careful design, the various energy losses that occur in any realization of this method, all of which may be expected to ultimately be thermalized, can be minimized, but they cannot be entirely eliminated. Since the materials used to make force transducers are temperature sensitive, their performance being sharply and often irreparably degraded by elevated temperatures, provision must be made for adequate cooling of impulse engines. This may be achieved in several ways. For example, if the engines must operate in vacuum, then Peltier junction devices can be applied to them. But in most circumstances vacuum operation should not prove necessary. For even in a vehicle in the vacuum of outer space, since no propellant is expelled by impulse engines, they can be located anywhere within a craft and cooled by a suitable transfer fluid that carries the heat to convenient radiators mounted on the exterior of the craft.

The method disclosed here in the simplest of circumstances can be further articulated and optimized in a number of ways. We give two purely illustrative and non-limiting examples of such optimizations/articulations. First, the force transducer(s) should be made part(s) of electrically resonant circuits by the addition of properly tuned inductive or capacitative circuit elements and resistive losses in the(se) circuit(s) should be minimized. These steps will reduce both waste heat generated and the power required to run the engine. (The electrical resonance frequency should be that for the low frequency voltage signal since the high frequency signal is the second harmonic of that signal and will automatically be resonant).

Figure 3:
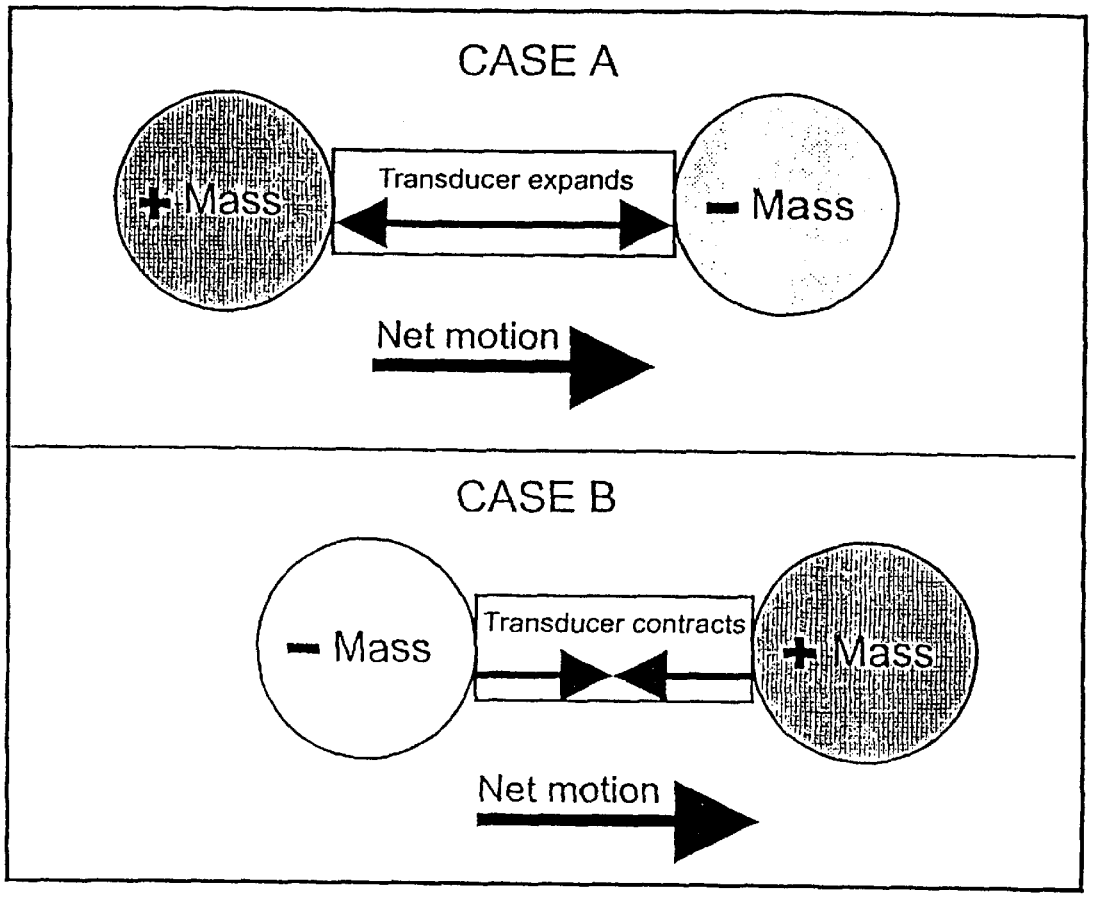
FIG. 3 is a schematic illustration of the principle of the method of two element impulse engines.
Figure 6:
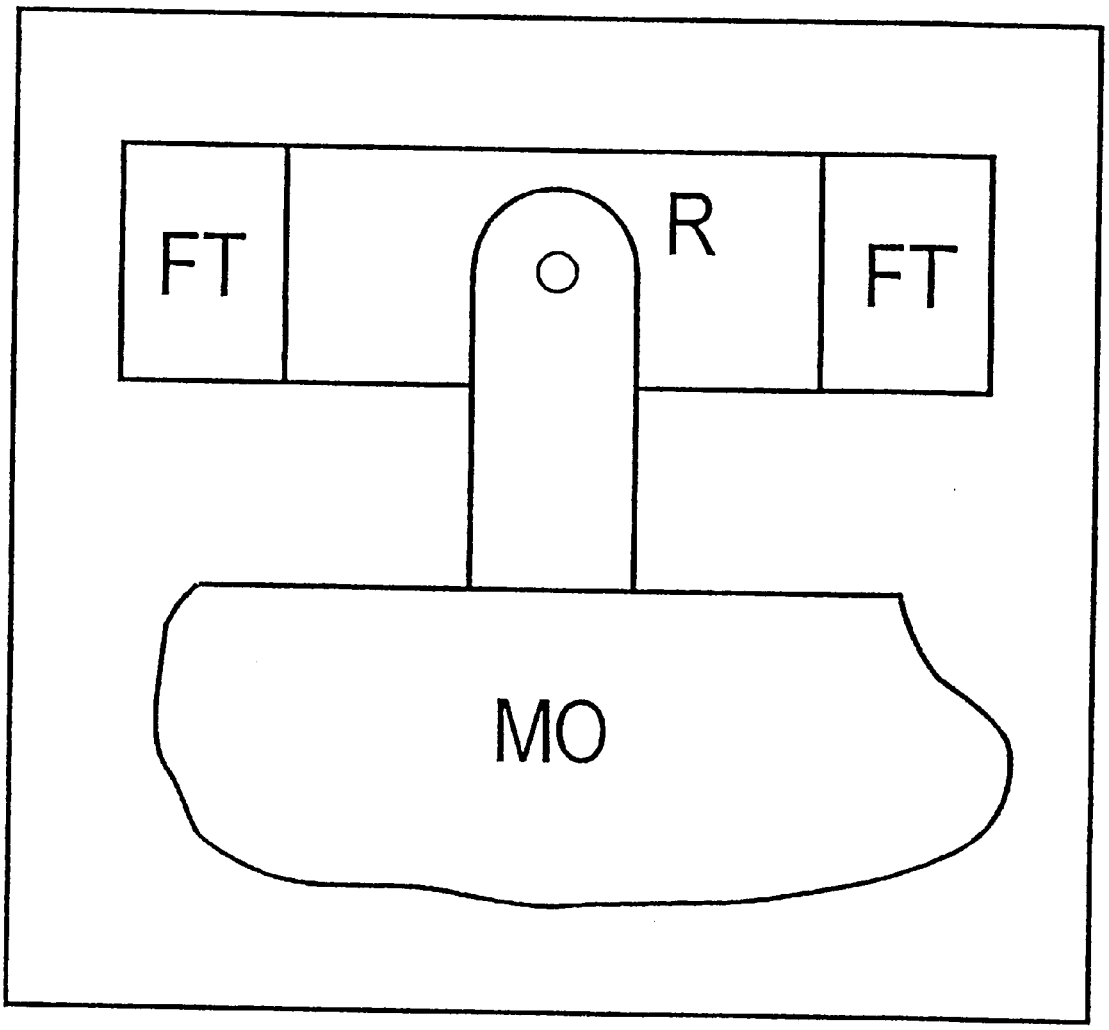
FIG. 6 is a longitudinal section diagram of a multiple active element impulse engine employing two force transducers (FT) affixed to the ends of a rod (R)

Second the "dumbbell" configuration of FIG. 3 can be used with modification. In particular, the inductive and capacitative circuit elements in which transient mass fluctuations are driven in that configuration can be replaced by force transducers driven by the multiple frequency waveforms of the present method, and the force transducer located between the now force transducers on the ends can be eliminated, as in FIG. 6. FIG. 6 is a longitudinal section diagram of a multiple active element impulse engine employing two force transducers(FT) affixed to the ends of a rod (R) which when excited by the high frequency signals applied to the transducers causes the transducer to undergo accelerations that produce a net force because of the transient mass fluctuation caused in the transducer by low frequency voltage signals with appropriately adjusted phases so that the mass fluctuations are 180 degrees out of phase. Also shown is a mid-point mount connecting the engine to the massive object (MO) to be acted upon. The mechanical structure between the force transducers becomes the resonant rod of FIG. 4, attached at its mid-point to the massive object to which the thrust is to be applied. The mass fluctuations in the two force transducers are adjusted to be 180 degrees out of phase and electrically resonant circuits are used to optimize a device of this sort.

EMPIRICAL CONSIDERATIONS

Figure 2:
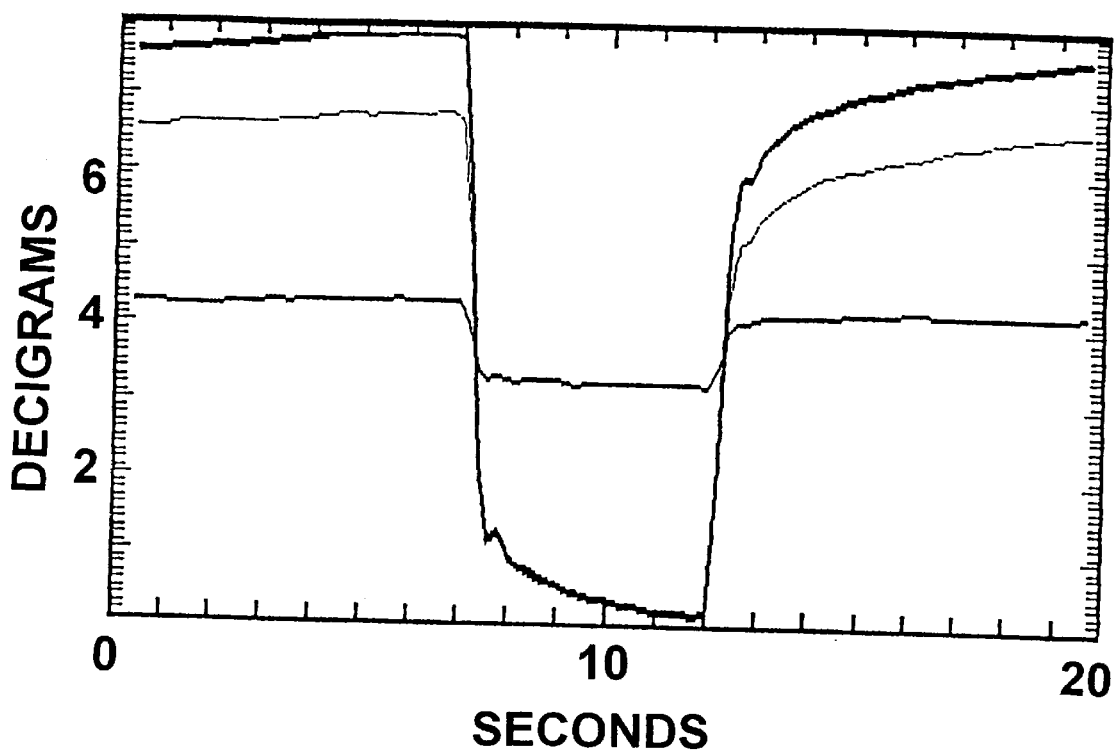
FIG. 2 displays the averaged results obtained with a device like that is shown in FIG. 1 where a capacitor array with a total capacitance of 0.02 microfarads mounted between piezoelectric transducer that produce an excursion of several hundred Angstroms was run at a power frequency of 29 kiloHertz during the time interval 7 to 12 seconds out of the 20 second data acquisition interval.
Figure 7A:
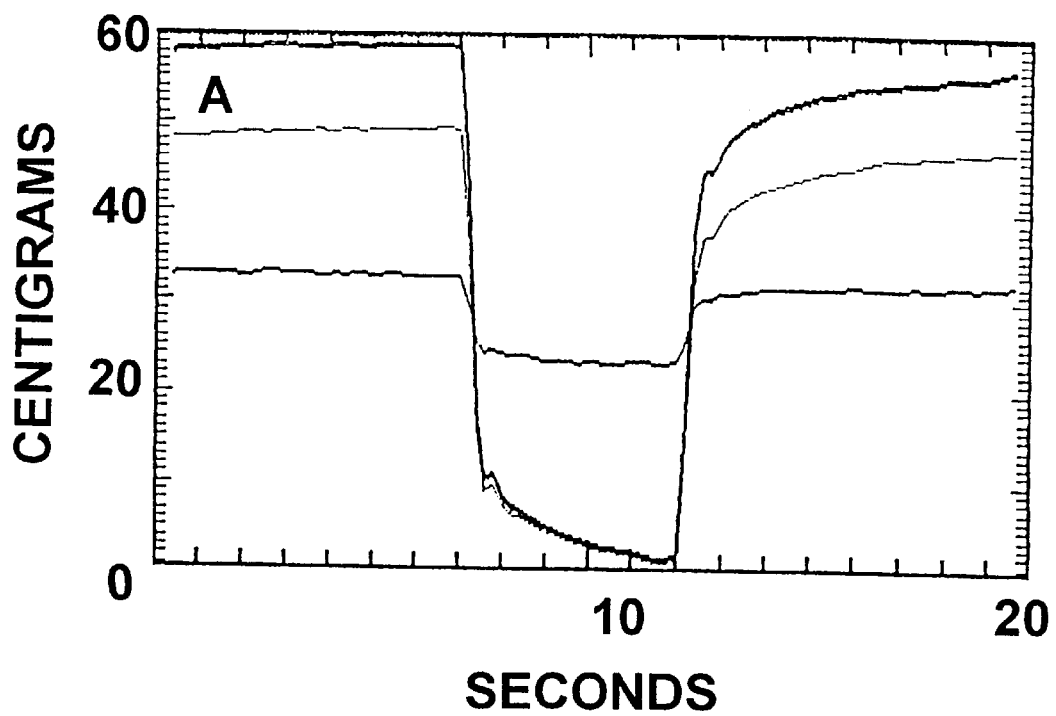
FIG. 7a displays results obtained with the device that produced the results shown in FIG. 2.

Evidence that the method here disclosed can be applied to practical scale situations is present in the results shown in FIG. 2. The device used to obtain these results was one with a separate CA and PZT. The experimental protocol employed to obtain the results was the differencing of cycles of data taken with the phase of the CA power waveform, initially fixed with respect to the PZT oscillation waveform, switched between the initial setting and one that differed by 180 degrees. This subtraction method permitted the elimination of systematic effects and errors that were insensitive to the relative phase of the CA and PZT. One of those systematic effects removed by this protocol was the obvious change in the force (in this case weight) registered by the force sensor when the PZT was switched on, plainly present for both phases in FIG. 2. This behavior is made plain in FIG. 7a where results are shown for two power levels of a simple sinusoidal voltage applied to the PZT in this device (that is, the CA was not activated at all). (Indeed, investigation of the origin of this systematic effect contributed to the conceptualization of the method here disclosed.) FIG. 7a displays results obtained with the device that produced the results shown in FIG. 2. Here, however, the capacitor array (CA) was not activated and the two traces that are differenced were produced by changing the amplitude of the voltage signal driving the PZT. Those amplitudes were chosen so that the behavior approximately mimicked the results shown in FIG. 2.

Figure 7B:
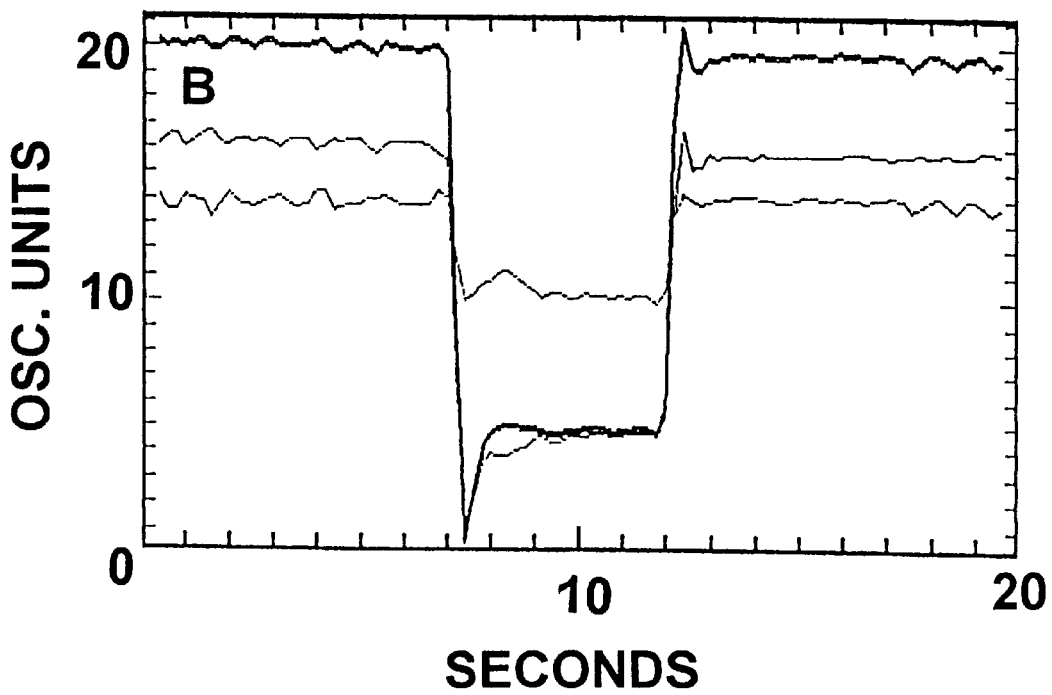

Setting aside the cause of the force produced when the PZT was activated, the sort of scalling one might expect is seen to be present. The larger the amplitude of the voltage signal, the larger the magnitude of the effect seen. And the larger should be the amplitude of the force sensor oscillations. The rectified AC coupled force sensor signals corresponding to the traces in FIG. 7a are displayed in FIG. 7b. FIG. 7b displays the sensor oscillation amplitudes, obtained by rectifying and filtering the AC coupled part of the total (AC and quasi-DC) sensor signal, corresponding to the results shown in FIG. 7a. Note that the zero-phase (heavy trace) quasi-DC signal corresponds to the larger oscillation amplitude, as expected if the effect scales with the power applied and the response of the spring diaphragm (D in FIG. 1) is approximately linear. (AC coupling removes any DC component of the signal, that is, any stationary force, so the rectified AC signal is proportional to the amplitude of mechanical oscillation of the sensor induced by the operation of the device. The sensor oscillation amplitude signals were not absolutely calibrated, so they are only identified as "oscillation units". These units, among the various results presented here, however, are always the same). As one would expect, the sensor oscillation amplitude is larger for the higher voltage signal delivered to the PZT. But the question remains: Are the observed effects produced by transient mass fluctuations coupled to mechanical excursions of parts of the apparatus? Or are they actually attributable to conventional sources?

THE REALITY OF TRANSIENT MASS FLUCTUATIONS

Inquiring into the cause of the forces recorded in FIG. 7a reveals three possibilities. They are: 1) Thrusts originating in acoustical coupling of the device to the enclosing case in which it resides; 2) Non-linear response of the force transducer, especially the diaphragm spring; and 3) A genuine effect. Other sources of spurious effects are ruled out by the protocols described in Woodward, 1996b and 1997b. Among those protocols one is particularly important; the shorting out of the CA and the placement of an equal capacitance elsewhere in the circuit so that all of the normal running conditions could be mimicked without inducing the mass fluctuation in the CA. When this was done, the differential effect in FIG. 2 disappeared as expected. (The stationary thrusts produced by activation of the PZT, however, were still present [and equal]).

Figure 8:
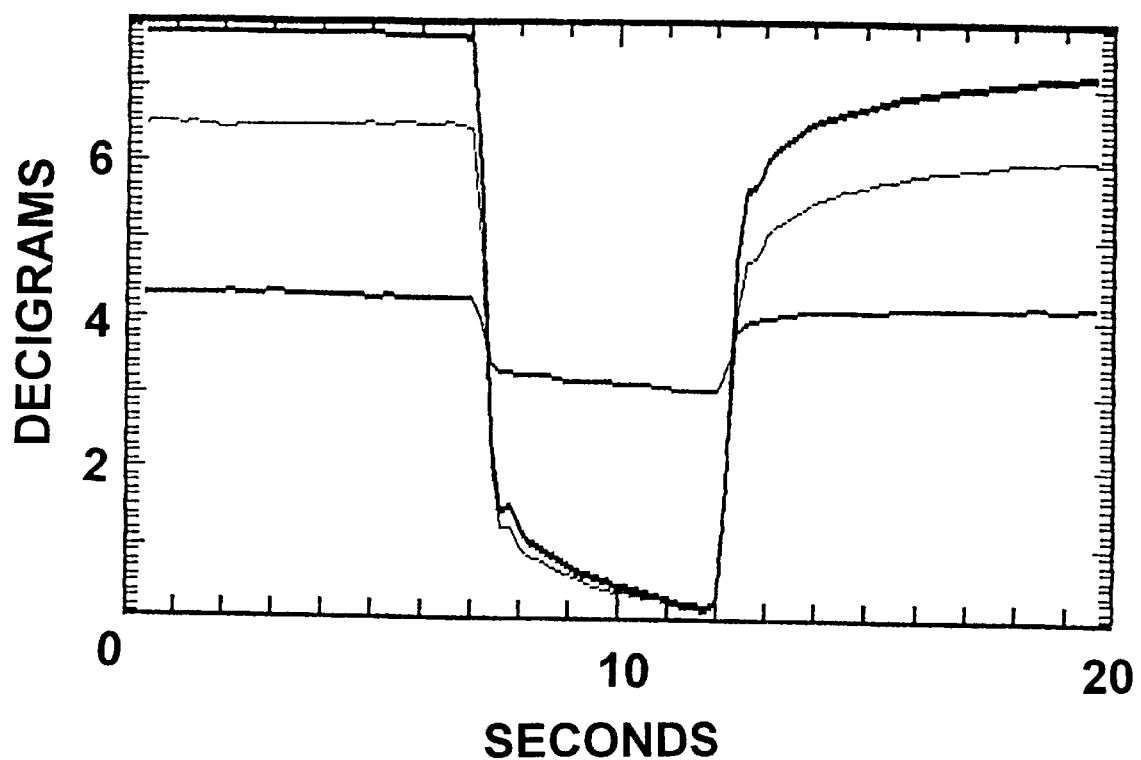
FIG. 8 displays the results obtained with the device that produced the vacuum results shown in FIG. 2, but with atmospheric pressure present in the case.

Acoustical coupling effects are easily excluded as the source of the forces by evacuating the enclosing case, thus removing the bulk of the coupling medium. Indeed, the results displayed in FIGS. 2, 7 and 8 were all obtained with a case pressure of less than 15 mm. of Hg. The results shown in FIG. 2 differ insignificantly from those obtained at atmospheric pressure, in otherwise identical circumstances, presented in FIG. 8. FIG. 8 displays the results obtained with the device that produced the vacuum results shown in FIG. 2, but with atmospheric pressure present in the case. Since the results for vacuum and atmospheric pressure differ insignificantly, it follows that the differential effects present in both instances cannot be attributed to acoustic coupling of the parts of the device to the rest of the apparatus. It follows that although acoustic coupling might be important in some apparatuses, in this apparatus, run under these conditions, it is not. The cause of both the differential thrust effect and the effect proper to the PZT must be sought elsewhere. Non-linear behavior of some sort is a likely candidate, for non-linearly coupled systems can produce unusual behavior. In the case of this apparatus, however, such non-linearity must occur in the force sensor, for non-linear behavior elsewhere in the system, by the conservation of momentum, cannot generate net thrusts.

When oscillatory motion is present, spring non-linearity can produce spurious force signals that might be mistaken for a genuine effect. Non-linearity effectively means that the spring constant ceases to be a constant and becomes a function of the distance through which the spring is compressed. Consequently, the mean position of the end of the loaded spring when in oscillation is not the same as that for simple static loading. Moreover, the mean position will be a function of the amplitude of the oscillation. For a linear spring the static and oscillatory mean positions are the same (irrespective of the amplitude of any oscillation). Other non-linear effects (for example, oscillatory displacement of the magnetoresistive elements of the force sensor from the region of the sense magnetic field where their response is linear) will also result in effects proportional to the amplitude of the driven oscillation. (The basic linearity of the position sensor and the bridge circuit used were more than adequate). As shown in FIG. 7b, activation of the PZT does induce an oscillation in the spring; one that is proportional to the amplitude of the voltage applied to the PZT. The question to be answered is: Does the resulting thrust detected, and its change with the applied voltage amplitude, arise from spring (or other) non-linearity in the force sensor, or a genuine mass fluctuation effect coupled to a second harmonic excursion induced in the PZT?

The answer to the question sought here is provided by inspecting the behavior of the oscillation amplitudes corresponding to the differential effects produced in air and vacuum for devices of the type already described. This is possible because the spring diaphragm of the force sensor responds to oscillations differently in vacuum as opposed to air. But in both air and vacuum its response to stationary forces remains the same. This behavior is a consequence of the normally sealed diaphragm having two No. 70 AWG holes drilled in its periphery to allow the interior and exterior pressures to equalize when the case is evacuated. The holes are so small that although pressure equalization takes place with a time constant of a second or so, for oscillations at frequencies of tens of kiloHertz, when air is present in the diaphragm it is unable to flow through the holes quickly enough to equalize as the oscillation proceeds. As a result, the air acts as a supplementary spring, changing the oscillatory response of the force sensor (from that in a vacuum) while leaving the response to quasi-stationary forces unchanged. Consequently, if the differential effects seen arise from non-linearities in the force sensor, then they should change in proportion to the change in the oscillatory behavior of the force sensor when the system is run in air and vacuum.

To demonstrate that force sensor non-linearities do not contaminate the results that show the presence of the mass fluctuation effect, we present data obtained with two different devices run in both air and vacuum in otherwise identical circumstances. The data for Device 1 is displayed in FIGS.

Figure 9B:
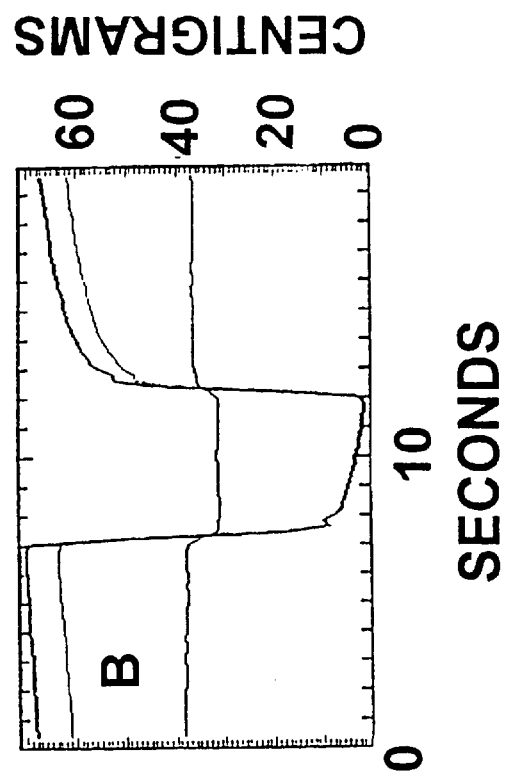
FIG. 9b displays the quasi-stationary force sensor traces and their difference obtained with Device 1 operating with the case evacuated.
Figure 9A:
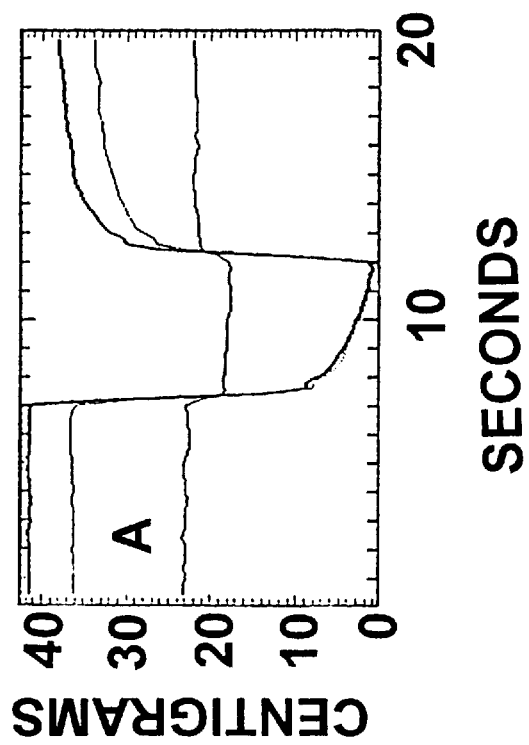
FIG. 9a displays the quasi-stationary force sensor traces and their difference obtained with Device 1 operating with atmospheric pressure in the case.

9a, 9b, 9c and 9d. FIGS. 9a and 9b show the quasi-stationary response in air and vacuum respectively. FIG. 9c presents the (AC coupled) force sensor oscillation amplitude that corresponds to panel A, and panel D the oscillation amplitude corresponding to panel B. Inspection of FIGS. 9c and 9d reveals that when the CA was switched on at 5 seconds into the cycles, a small oscillation was set up in the spring. (The deviation from the initial quiescent state was in opposite directions for the two phases because the reference signal for the lockin amplifier that rectifies these signals is the source voltage signal for the PZT which did not change when the relative phase of the PZT and CA power waveforms were shifted by 180 degrees). When the PZT was switched on at 7 seconds and additional, much larger oscillation was set up in the spring.

Figure 9D:
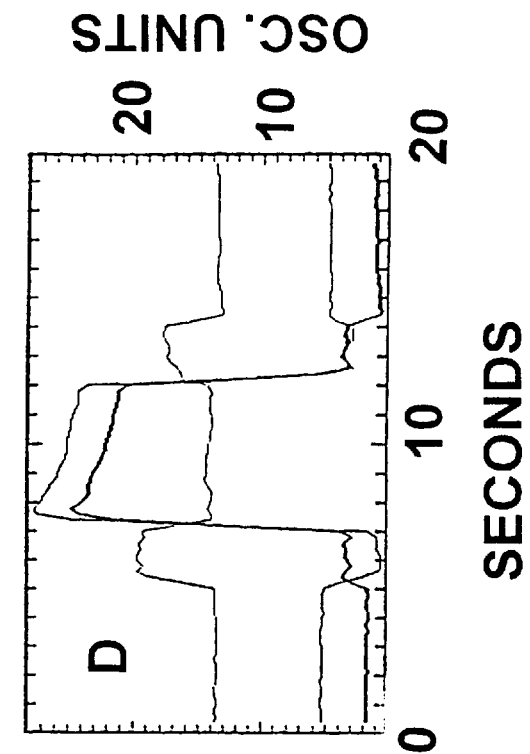
Figure 9C:
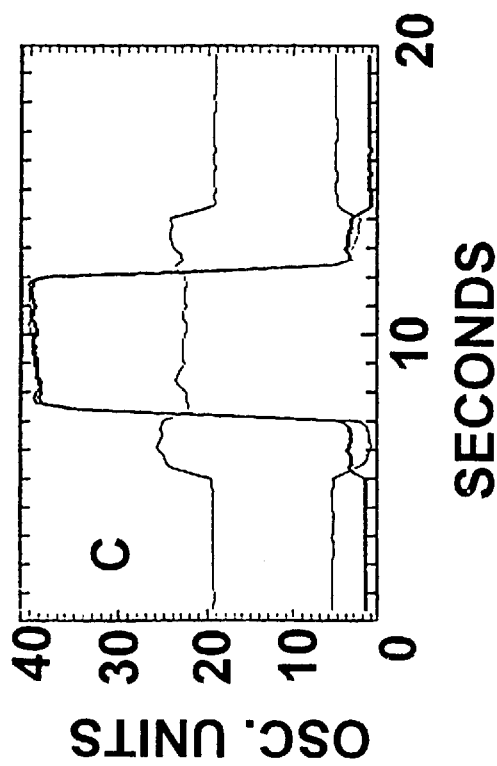
Figure 10D:
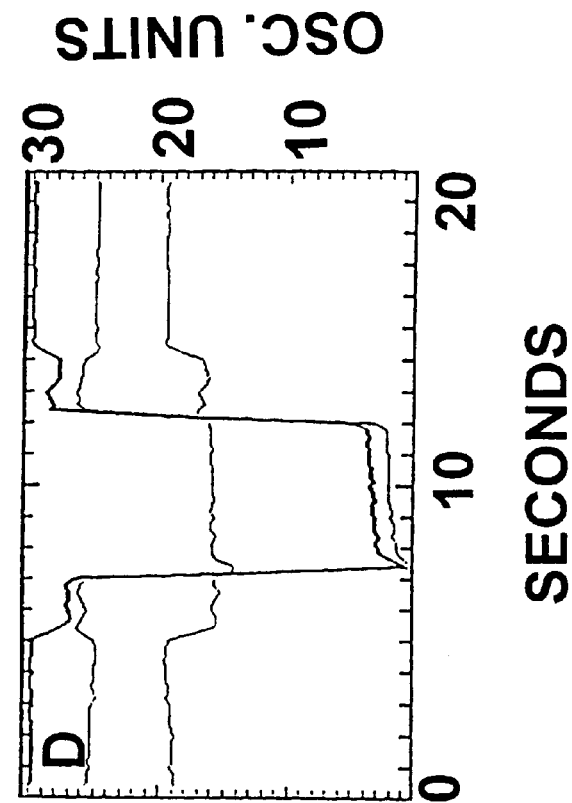
FIG. 10d displays the oscillation amplitude traces and their difference that correspond to the traces presented in FIG. 10b.
Figure 10C:
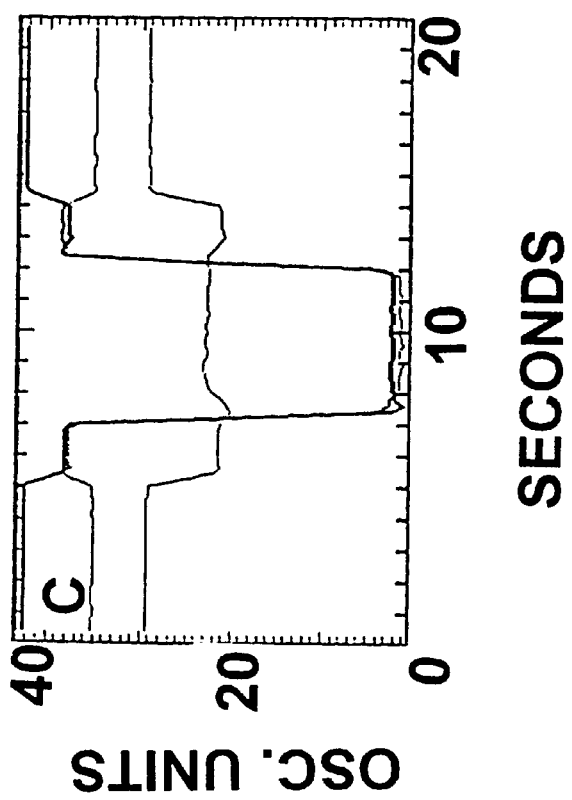

Comparing the total oscillation amplitudes (with both the CA and PZT on) in FIGS. 9c and 9d, we see that the amplitude in vacuum (FIG. 9d) is smaller than that in air (FIG. 9c) by about 40 percent, as expected. Comparison of the differential quasi-stationary forces in FIGS. 9a and 9b (the heavy traces that roughly bisect the diagrams) should reflect this behavior if force sensor non-linearities are their cause. But the measured differential effect in vacuum (FIG. 9b) is about 20 percent larger, rather than 40 percent smaller, than the effect in air (FIG. 9a). This is precisely the opposite of expectation on the force sensor non-linearities hypothesis. (The larger quasi-stationary effect in vacuum can be accounted for by the excursion of the CA/PZT assembly not being damped by the presence of air in the case).

The conclusion that force sensor non-linearities are not the cause of the differential quasi-stationary signals seen in FIGS. 9a–d are corroborated by results obtained with a second, similar device. When run in approximately comparable circumstances, the results displayed in FIGS. 10a, 10b, 10c and 10d were obtained. The details differ from FIGS. 9a–9d. There is a 30 percent decrease in oscillation amplitude in vacuum instead of 40 percent. And there is only a 5 percent increase in the quasi-stationary differential effect in vacuum rather than 20 percent. But the basic behavior remains inconsistent with the force sensor non-linearities hypothesis. This is yet more starkly apparent in FIGS. 11a–11d, the counterpart of FIGS. 10a–10d for a higher power signal applied to the PZT with this device. Here the oscillation amplitude decrease in vacuum is about 70 percent rather than 30 or 40 percent. Yet the differential quasi-stationary forces in both air and vacuum are about 100 milligrams (dynes).

Figures 11A, 11B:
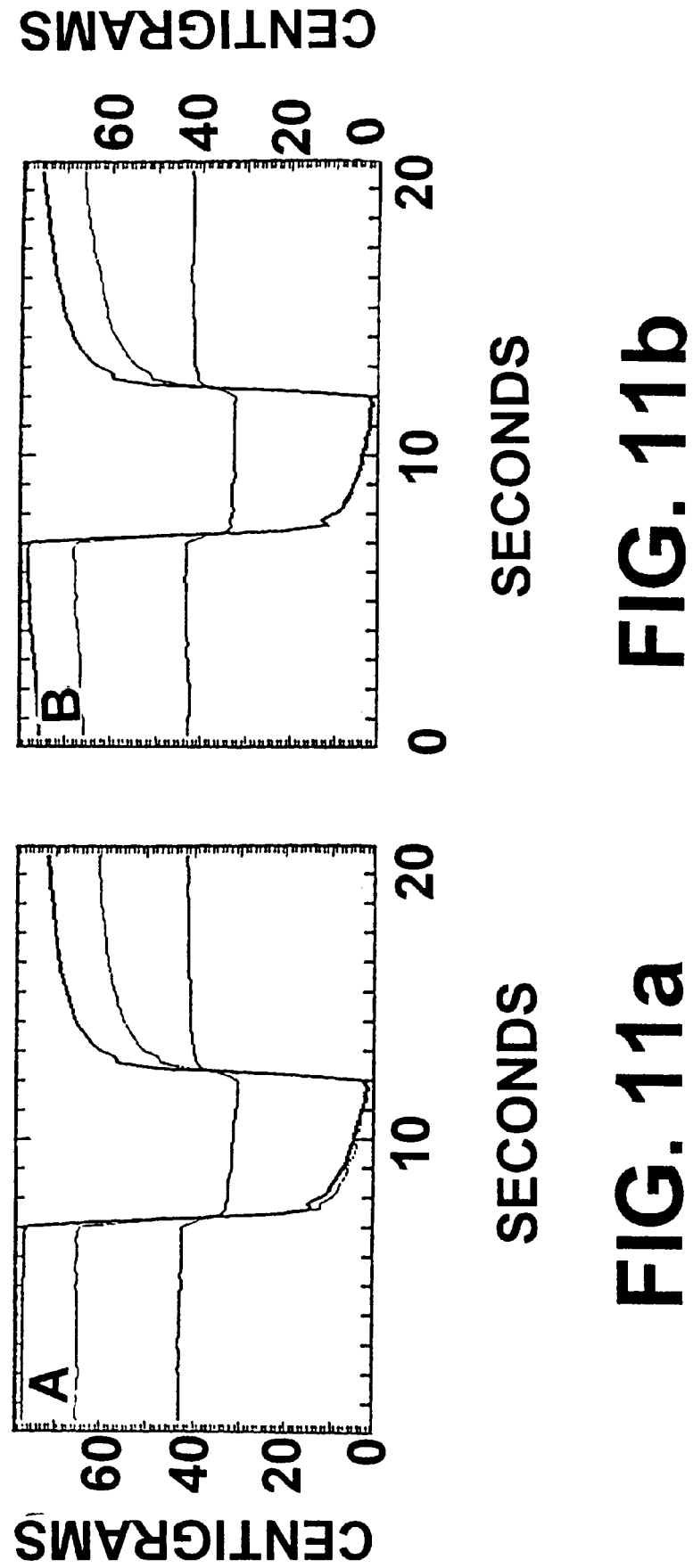
FIG. 11a displays the quasi-stationary force sensor traces and their difference obtained with Device 2 operating with a larger applied voltage to the PZT than that used for FIG. 10 with atmospheric pressure in the case.
FIG. 11b displays the quasi-stationary force sensor traces and their difference obtained with Device 2 operating with the case evacuated.
Figures 11C, 11D:
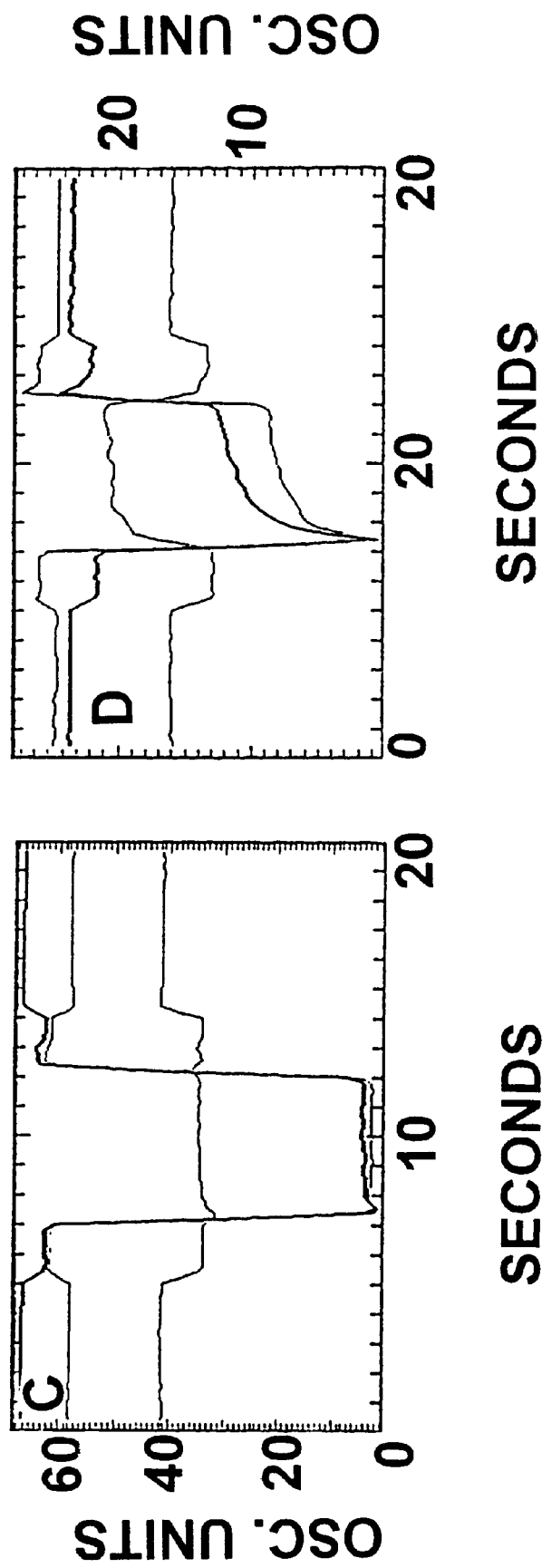

Further corroboration of the conclusion that force sensor non-linearities are not the cause of the differential quasi-stationary forces detected can be found in the details of the data presented in FIGS. 9–11. For example, in FIG. 9d (Device 1) the differential oscillation amplitude trace (that roughly bisects the panel) reveals that when both the CA and PZT were activated, the total oscillation amplitudes for the two phases were essentially identical. This, on the non-linearities hypothesis, requires that no differential quasi-stationary force effect be present in FIG. 9b, but the effect is there nonetheless. Similarly, in FIG. 11d (Device 2, high power) we find that the smaller oscillation amplitude (heavy trace) corresponds to the larger quasi-stationary effect (heavy trace) in FIG. 11b. This is precisely the opposite of expectation on the non-linearities hypothesis. So the conclusion that the quasi-stationary effect is not due to force sensor non-linearities is warranted. Since no other spurious effect accounts for the observed effect, by exclusion we may infer that it arises from transient mass fluctuations.

Figure 12A:
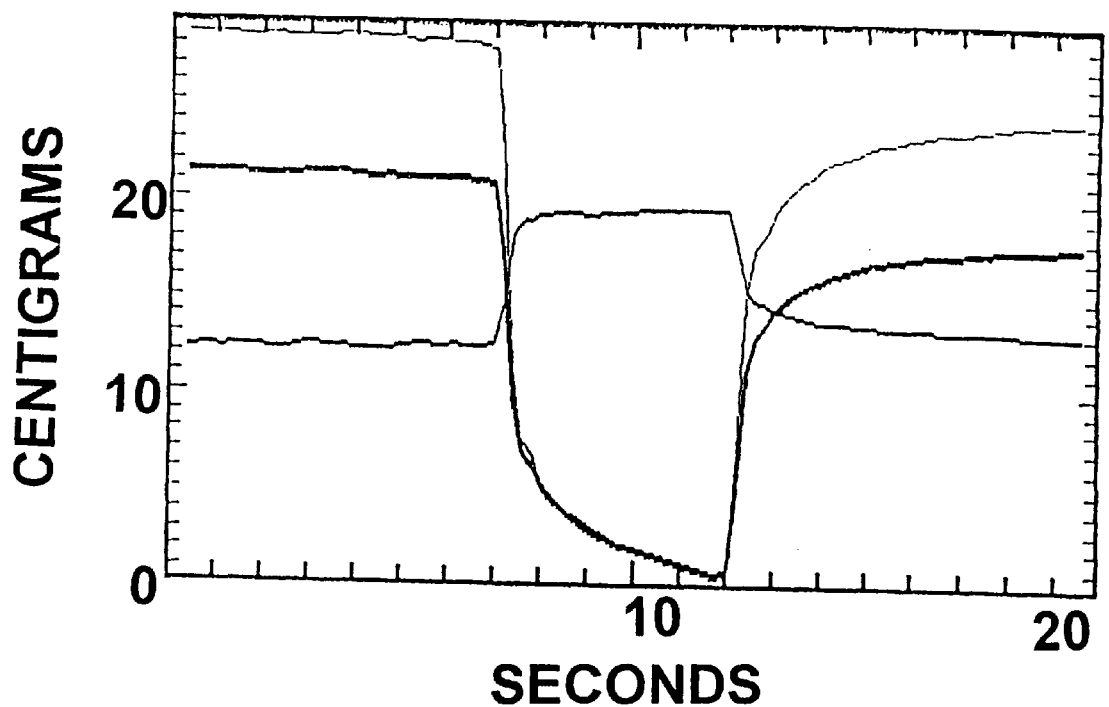
FIG. 12a displays the results obtained with a device similar to Device 2 run with the apparatus oriented vertically (with atmospheric pressure in the case)
Figure 12B:
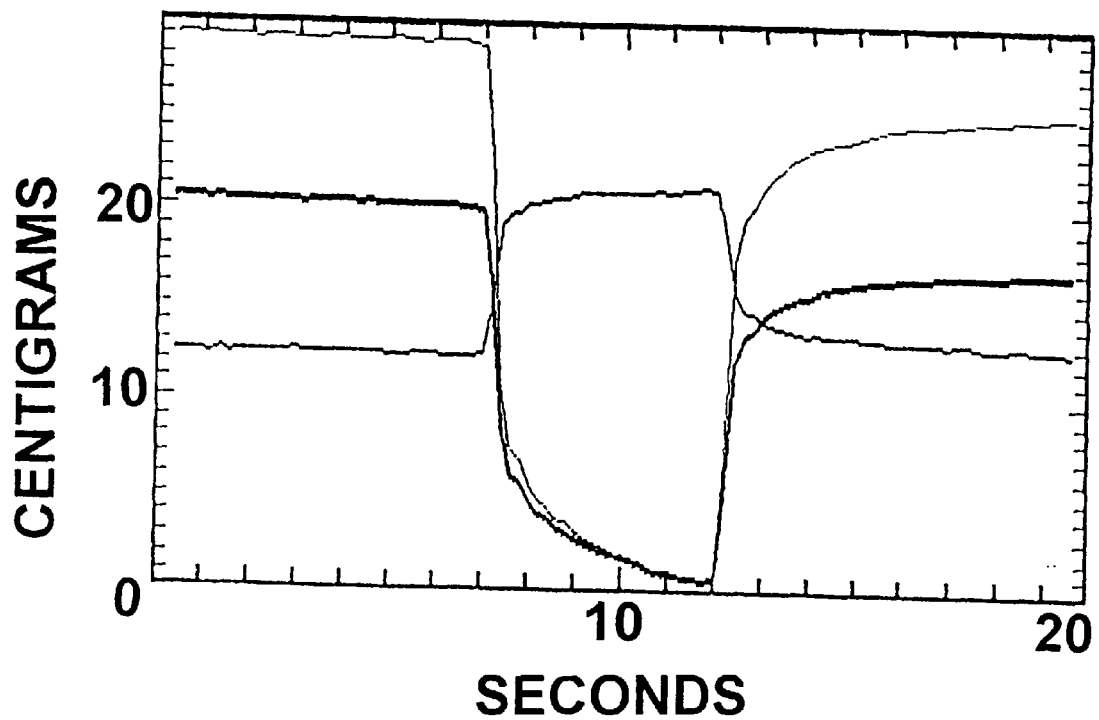
FIG. 12b displays the results obtained with the apparatus oriented horizontally corresponding to those in FIG. 12a for vertical orientation.

Another test of the genuiness of the stationary force effect can be conducted by running the apparatus in a horizontal orientation and comparing the results obtained with those produced when the apparatus is run in its normal vertical orientation. Should the effect depend on some subtle coupling to local objects, one would expect the measured effect to change. But if the effect is genuine, it should be independent of the local orientation of the apparatus since the mass fluctuation effect is generated by an interaction with the uniformly distributed distant matter in the universe. The results of such a test (for yet another device than those mentioned so far similar to Device 2) are displayed in FIGS. 12a and 12b. The magnitude of the differential effect is essentially the same for both orientations, corroborating the predicated orientation independence.

PRACTICAL DEMONSTRATION OF THE METHOD

Force transducers, PZTs in particular, activated by complex waveforms as disclosed here, should produce thrusts as described above. The device shown in FIG. 13 was constructed to demonstrate the feasibility of the disclosed method. The device consists of a stack of PZT disks 0.75 inches in diameter by about 0.75 inches thickness mounted on a brass plate (that is bolted to the weighing suspension of the device depicted schematically in FIG. 1). To avoid thermal degradation of the mechanical performance of the PZT, it is clamped to the brass plate with an aluminum disk and six machine screws. Power is delivered to the PZT via a twisted pair of stranded 26 AWG copper wires. The resonant rod (R) of FIG. 4 is the suspension that connects the PZT assembly with the spring diaphragm located in the bottom of the case. The case corresponds to the massive object (MO) of FIG. 4.

Figure 13:
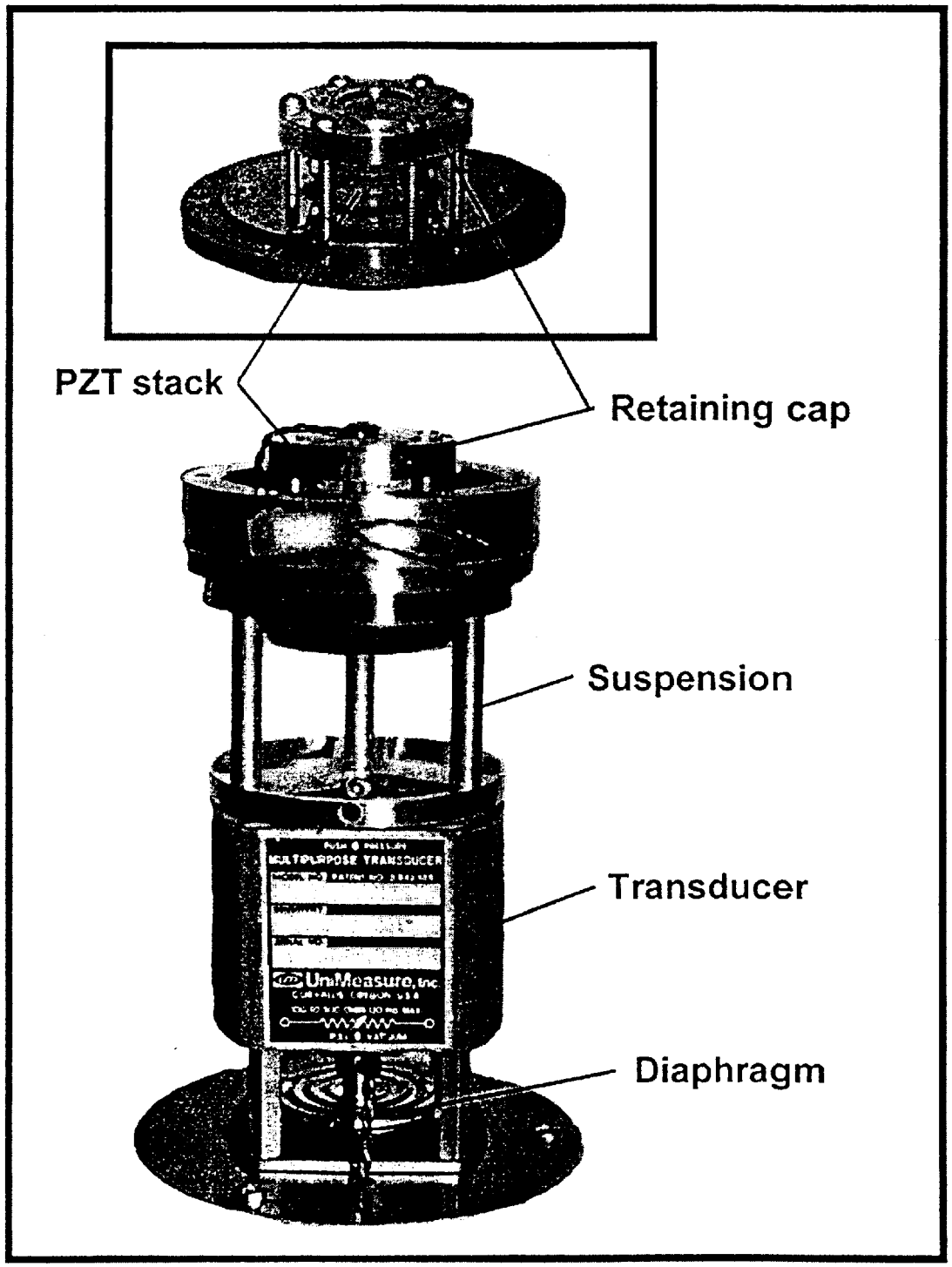
FIG. 13 is a photo showing the device comprises of a stack of PZT disks clamped between a brass base plate and an aluminum cap used to obtain the results presented in FIGS. 13 and 14.
Figure 14D:
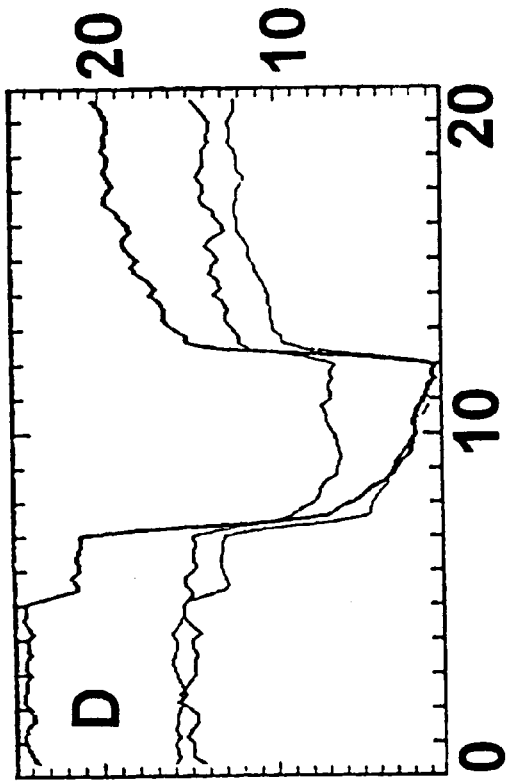
Figure 14C:
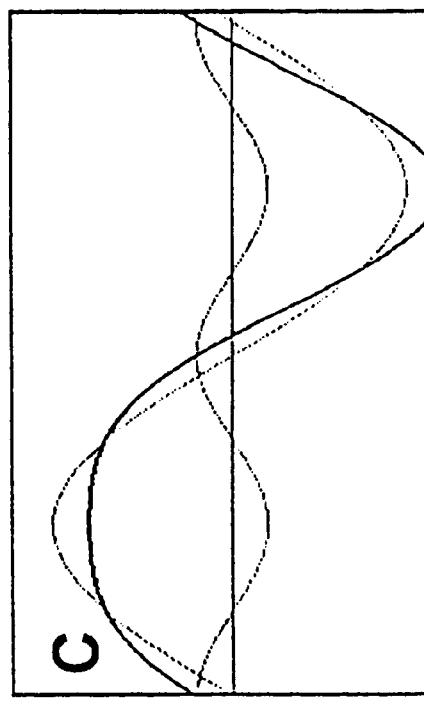
Figure 15:
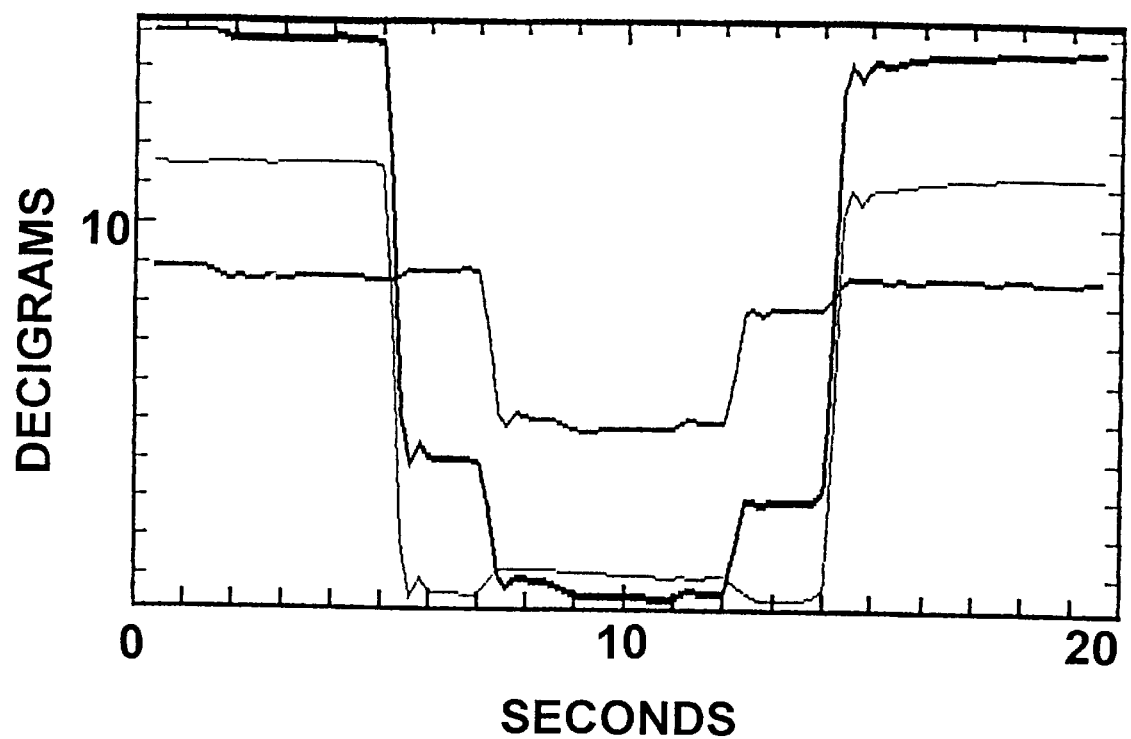
FIG. 15 displays the results obtained with the device shown in FIG. 13 run at higher power (about 100 Watts).

The voltage waveforms that were applied to the device shown in FIG. 13 and produced large effects, are displayed in FIG. 14 along with the differential forces produced when the power used was about 50 Watts. Typically, the amplitude of the high frequency component of the signal was a fifth or less of the amplitude of the low frequency component (as shown). Since the power in each frequency component is proportional to the square of the voltage amplitude, almost all of the power delivered to the PZT went into the low frequency component driving the mass fluctuation. Results obtained when the device was driven with a signal of roughly 100 watts power are presented in FIG. 15. The low frequency, high power component of the voltage signal that drives the transient mass fluctuation in the PZT was activated at 5 seconds in each data cycle. At 7 seconds into each data cycle the high frequency, low power component of the voltage signal was switched on. The voltage waveform used was that in FIG. 14a. (The sequence of phase alternation here, however, was reversed, so the differential trace is inverted with respect to that in FIG. 14b). Differential thrusts of about 400 dynes (0.4 grams) were produced at this modest power level. With optimization and appropriate scaling one should be able to significantly increase the thrusts.

FURTHER CONSIDERATIONS RELATING TO THE METHOD

In an ideal impulse engine the circuits containing the fluctuating mass element(s) and the force transducer(s) would be completely lossless. That is, in a two element engine like that shown in FIG. 3, the LC circuit would be superconducting and the cores of the L and C would not thermalize any of the energy periodically transiently stored in them. Thus, once activated, the energy flow in this circuit that produces the mass fluctuations, would continue indefinitely without attenuation. (Since this will not be true in a real engine, as mentioned above, provision must be made for the disposal of waste heat). Likewise, an ideal force transducer, once activated, like a lossless spring, should continue to oscillate with constant amplitude forever, notwithstanding that the mass(es) on its end(s) may be fluctuating periodically. (As with the LC circuit, since ideal behavior can at best only be approximated, losses may be expected, resulting in waste heat that will have to be disposed of).

The ideal, completely lossless impulse engine reveals an issue that should be addressed: Once activated, an ideal impulse engine will continue to produce an accelerating force without diminution of the activating energy and therefore without the need of continuing delivery of energy to the engine from local sources. Viewed locally, the engine seems to violate both the conservation of momentum and energy because it can cause the acceleration both of itself and any unconstrained massive body to which it may be attached. (Note that such violations do not occur in an engine where the fluctuation of the masses of the elements on the ends of the force transducer are effected by the transport of some mass back and forth between the elements. In this case the inertial reaction produced by the mass transport precisely compensate the forces that would otherwise produce impulse engine behavior).

Impulse engines work because the mass fluctuations in the inductive and/or capacitative components do not depend on the passing of mass back and forth between them. Rather, the origin of the mass fluctuations in each of the elements (notwithstanding that they may be electrically coupled) is in a field interaction with chiefly the most distant matter in the universe. This is apparent from the fact that the transient source terms (in the field equation presented above) that account for the mass fluctuations arise from the interaction between accelerated local objects and the field that causes inertial reaction forces. That field is the gravitational interaction with cosmic matter. Various considerations [Woodward, J. F. (1996a), "Killing Time" Found. Phys. Lett. 9, 1–23] suggest that the momentum and energy transfer conveyed by this field involved in impulse engines take place as retarded and advanced effects traveling at the speed of light along the future lightcone [Woodward, 1997b]. The presence of advanced effects (that propagate backward in time) make the transfer appear instantaneous. In effect, an impulse engine pushes off the matter located along the future lightcone through an inertial/gravitational interaction. In so doing, positive energy and momentum flow backward in time along the future lightcone to the engine.

A few technical details, critical to the successful implementation of the method here disclosed, deserve mention. First, since the method only works when all of the forces generated in the engine behave as described above, ensuring as nearly ideal, rigid mechanical contact between the various components of the engine is essential. Particularly important in this connection is the sparing and very careful use of adhesives. They can easily degrade mechanical joints and produce serious acoustic impedance mismatches that can compromise engine efficiency. For this reason, whenever possible mechanical fasteners should be used. Second, since the mass fluctuation effect scales with the frequency of the applied voltage signal, operation at high frequency is desirable. When the operation frequency exceeds five kiloHertz in engines more than several centimeters in length, however, acoustic waves reflected in the engine (and objects to which the engine is attached) may interfere with the primary engine excitations and degrade, perhaps dramatically, engine performance. Accordingly, the engine (and any object to which it is attached) must be designed to minimize unwanted reflected sound waves. This may be accomplished by using surfaces that greatly attenuate acoustic energy reflections or by shaping surfaces to reflect acoustic energy in a selected direction which precludes interference with primary engine excitations.

Having thus disclosed a detailed description of a method and apparatus of the invention, it being understood that the disclosure herein is of exemplary preferred embodiments that are not necessarily limiting of the scope of protection afforded hereby, what we claim is:

1. A method of producing thrust in an object without ejection of propellant; the method comprising the following steps:
   a) providing a force transducer having a mechanical resonance frequency and having a material core responsive to an applied time-varying electromagnetic field by storing energy in said core as a result of material polarization which induces transient mass fluctuations in said core in accordance with said time-varying electromagnetic field;
   b) applying a first time-varying electromagnetic signal to said force transducer to induce said transient mass fluctuations;
   c) applying a second time-varying electromagnetic signal to said force transducer at said mechanical resonance frequency to excite a mechanical oscillation in said transducer; and
   d) controlling the relative amplitudes and phase of said first and second time-varying electromagnetic signals to induce a thrust in said transducer.

2. The method recited in claim 1 wherein said first time-varying electromagnetic signal has a frequency which is one-half the frequency of said second time-varying electromagnetic signal.

3. The method recited in claim 1 wherein each of said first and second time-varying electromagnetic signals comprises an AC electrical signal.

4. The method recited in claim 3 wherein step d) is carried out by the following steps:
   e) generating an electrical signal;
   f) connecting said signal to a frequency doubler and to a phase shifter;
   g) combining the outputs of said frequency doubler and said phase shifter; and
   h) applying said combined outputs to at least one amplifier.

5. The method recited in claim 1 further comprising the step of connecting said force transducer by a connecting mechanism to an object to be subjected to said thrust and wherein said mechanical resonance frequency is the mechanical resonance frequency of the combination of the force transducer and the connecting mechanism.

6. The method recited in claim 5 wherein said connecting mechanism comprises a rod having opposed ends and wherein said rod is affixed to the force transducer at a first end and is affixed to the object at a second end.

7. The method recited in claim 1 further comprising the step of phase-locking the first and second time-varying electromagnetic signals to one another with a selected phase difference between their respective waveforms.

8. A method of producing thrust in an object without ejection of propellant; the method comprising the following steps:
   a) providing a plurality of force transducers having a mechanical resonance frequency and having a material core responsive to an applied time-varying electromagnetic field by storing energy in said core as a result of material polarization which induces transient mass fluctuations in said core in accordance with said time-varying electromagnetic field;

b) applying a first time-varying electromagnetic signal to said plurality of force transducers to induce said transient mass fluctuations;

c) applying a second time-varying electromagnetic signal to said plurality of force transducers at said mechanical resonance frequency to excite a mechanical oscillation is said transducers; and d) controlling the relative amplitudes and phase of said first and second time-varying electromagnetic signals to induce a thrust in said transducers.

9. The method recited in claim 8 wherein said first time-varying electromagnetic signal has a frequency which is one-half the frequency of said second time-varying electromagnetic signal.

10. The method recited in claim 8 wherein each of said first and second time-varying electromagnetic signals comprises an AC electrical signal.

11. The method recited in claim 10 wherein step d) is carried out by the following steps:

e) generating an electrical signal;

f) connecting said signal to a frequency doubler and to a phase shifter;

g) combining the outputs of said frequency doubler and said phase shifter; and h) applying said combined outputs to at least one amplifier.

12. The method recited in claim 8 further comprising the step of connecting said force transducers by a connecting mechanism to an object to be subjected to said thrust and wherein said mechanical resonance frequency is the mechanical resonance frequency of the combination of the force transducers and the connecting mechanism.

13. The method recited in claim 12 wherein said connecting mechanism comprises a rod having opposed ends and wherein respective ones of said plurality of force transducers are affixed to said opposed ends of said rod and said object is affixed to said rod between said opposed ends.

14. The method recited in claim 13 further comprising the step of controlling the respective phases of said first and second time-varying electromagnetic signals so that mass fluctuations in said respective ones of said plurality of force transducers are selected to produce a net force in said object.

15. An apparatus for producing thrust in an object to which the apparatus is connected, the apparatus comprising:

a force transducer having a mechanical resonance and having a material core responsive to an applied time-varying electromagnetic field by storing energy in said core as a result of material polarization which induces transient mass fluctuations in said core in accordance with said time-varying electromagnetic field;

means for applying a first time-varying electromagnetic signal to said force transducer to induce said transient mass fluctuations;

means for applying a second time-varying electromagnetic signal to said force transducer at said mechanical resonance frequency to excite a mechanical oscillation in said transducer; and means for controlling the relative amplitudes and phase of said first and second time-varying electromagnetic signals to induce thrust in said transducer.

16. The apparatus recited in claim 15 wherein the frequency of said first time-varying electromagnetic signal is one-half the frequency of said second time-varying electromagnetic signal.

17. The apparatus recited in claim 15 wherein each of said first and second time-varying electromagnetic signals comprises an AC electrical signal.

18. The apparatus recited in claim 15 wherein said means for controlling comprises an electrical signal generator the output of which is applied both to a frequency doubler and a phase shifter the respective outputs of which are combined and amplified in a power amplifier.

19. An apparatus for producing thrust in an object to which the apparatus is connected, the apparatus comprising:

a plurality of force transducers having a mechanical resonance and having a material core responsive to an applied time-varying electromagnetic field by storing energy in said core as a result of material polarization which induces transient mass fluctuations in said core in accordance with said time-varying electromagnetic field;

means for applying a first time-varying electromagnetic signal to said plurality of force transducers to induce said transient mass fluctuations;

means for applying a second time-varying electromagnetic signal to said plurality of force transducers at said mechanical resonance frequency to excite a mechanical oscillation in said transducers; and means for controlling the relative amplitudes and phase of said first and second time-varying electromagnetic signals to induce thrust in said transducers.

20. The apparatus recited in claim 19 wherein said force transducers are affixed at opposite ends of a rod and said object is connected to said rod between said ends and wherein said means for controlling adjusts the respective phases of said first and second time-varying electromagnetic signals so that mass fluctuations in said respective force transducers are selected to produce a net force in said object.

* * * * *

UNITED STATES PATENT AND TRADEMARK OFFICE
CERTIFICATE OF CORRECTION

PATENT NO : 6,098,924
DATED : August 8, 2000
INVENTOR(S) : James Woodward and Thomas Mahood It is certified that error appears in the above-identified patent and that said Letters Patent are hereby corrected as shown below:

Title page, Item No. 73 (Assignee): None

Signed and Sealed this

Tenth Day of April, 2001

Attest:

NICHOLAS P. GODICI

Attesting Officer    Acting Director of the United States Patent and Trademark Office